Feb. 7, 1967  W. B. CONRAD  3,302,479
LOW LOAD FLEXIBLE CONDUIT
Filed Sept. 11, 1963

INVENTOR.
Winthrop B. Conrad
BY
Barnard, McGlynn & Leising
ATTORNEYS

United States Patent Office 3,302,479
Patented Feb. 7, 1967

3,302,479
LOW LOAD FLEXIBLE CONDUIT
Winthrop B. Conrad, Franklin, Mich., assignor to Teleflex Incorporated, North Wales, Pa., a corporation of Delaware
Filed Sept. 11, 1963, Ser. No. 308,239
2 Claims. (Cl. 74—501)

The subject matter of this invention is an improved low-cost flexible cable type mechanical control device and method for making same.

Control devices of the general type to which this invention relates comprise a flexible tubular conduit through which there extends a core element, such as a wire, which is freely rotatable or movable to and fro within the conduit. Such controls are commonly used, for example, to open and close vents or the like from the instrument panel of automotive vehicles and as controls extending from the instrument panel to the vehicle engine, a choke control being a typical illustration. The desirable characteristics sought to be attained in all such controls are good flexibility, minimum frictional contact or binding between the core element and the conduit, good radial and tensile strength, and low cost. The latter is particularly important for high production controls for automobiles and other automotive vehicles.

The requirement for flexibility precludes the use of an ordinary metal tube as the conduit, and a simple plastic tube having the required flexibility is deficient in that it lacks the necessary strength particularly against radial loads. Flexible metal conduits formed of coiled wire or coiled metal strip have been proposed; however they are disadvantageous because of the high friction and binding which occurs between the core element and such conduit. Conduits of composite construction have also been proposed. For example, it is presently common practice to form conduits of a plastic inner tube surrounded by a flexible metal sheath consisting of a plurality of wires wrapped on a long lead, as disclosed for example in Cadwallader U.S. Patent No. 3,063,303, or consisting of a coiled metal strip or a wire. The present invention constitutes a marked improvement in the latter type construction.

In accordance with the present invention there is provided a low cost composite conduit comprising a flexible plastic tube surrounded by a reinforcing metal wire wrapping and wherein the wire wrapping, by reason of its relationship with the plastic tube, greatly enhances the function and operation of the tube in minimizing frictional contact or binding between the tube and the movable core element extending therethrough. Further, by reason of the relationship between the metal coil and the plastic tube, there is provided a highly durable conduit which has excellent strength characteristics, particularly against radial loads, and which can be efficiently manufactured at low cost. Briefly, conduit constructed in accordance with the invention comprises a flexible plastic tube surrounded by a metal wire wrapping, preferably a coil having its adjacent loops in spaced or nonabutting relationship, the internal diameter of the wrapping being less than the external cross-section or diameter of the tube whereby the wrapping compresses the tube sufficiently that it is at least partially embedded therein and creates radially inwardly extending axially spaced projections on the inner surface of the tube. Where the tube has cylindrical inner and outer surfaces and the wrapping is a coil, as is preferred, such projections constitute a spiral or helix which conforms to the shape of the metal coil wrapping; however, as will be manifest from the description of other embodiments set forth hereinafter, other configuration for the projections on the inner wall of the tube can be used if desired. The projections on the inner surface of the tube serve as bearing surfaces for the movable core element and hence substantially reduce the frictional contact between the core element and the conduit. Since the metal wire is wrapped sufficiently tightly around the tube to become at least slightly embedded therein, by reason of deformation of the tube, the tube and coil become almost as one piece with no possibility, in normal usage, for movement of the tube with respect to the coil. Hence the wrapping serves as a reinforcing sheath which in combination with the tube as described, provides a conduit having excellent tensile and radial strength, particularly the latter. Such structure can be manufactured by first forming a metal coil, as by wrapping on a mandrel, to a slightly less internal diameter than the external diameter of the plastic tube, and then twisting or threading the metal coil onto the tube such that as it is threaded onto the tube it deforms the latter to creae is own spiral shaped thread therein. Or the metal coil can be initially formed with an internal diameter about the same as or slightly greater that the outer diameter of the tube, slipped over the tube and the assembly then passed through a swaging machine with a helix form die to thereby reduce the coil diameter such that the coil is embedded into the plastic tube creating a spiral deformation in the latter.

The above and other features and advantages of the invention will appear more clearly from the following detailed description of preferred embodiments thereof made in reference to the drawings in which.

Figure 1:
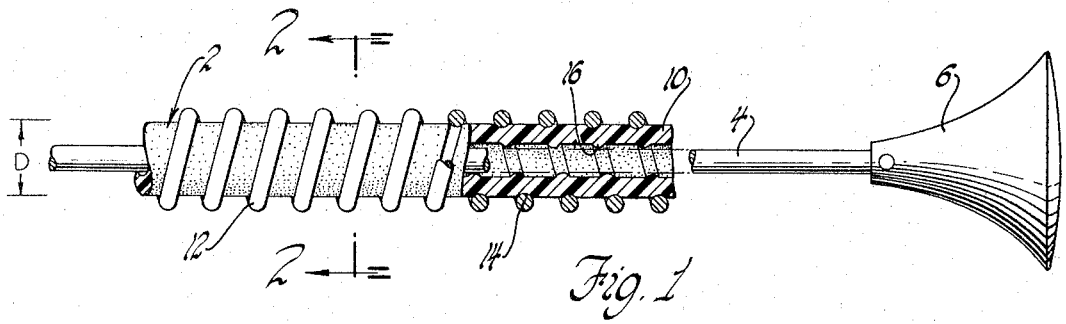
FIGURE 1 is a side view with parts broken away and partially in section of a flexible push-pull control embodying the invention.
Figure 2:
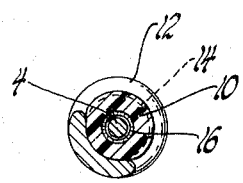
FIGURE 2 is a view taken on the line 2—2 of FIGURE 1.

Referring now to FIGURES 1 and 2, the control shown comprises a flexible conduit 2, hereinafter described in detail, having a flexible core element or wire 4 extending therethrough and slidable to and fro therewithin. One end of the core element has a control knob 6 secured thereto which would be mounted say on a vehicle instrument panel, and the other end of the core wire would, of course, be connected to the vent or other element to be controlled. The core element can consist of a unitary or monofilament metal, or the like, wire; or it can consist of a group of thin metal wires twisted in the conventional manner to form a cable.

In accordance with the invention, the conduit comprises a tube 10 of organic polymeric material, herein frequently referred to as a plastic tube for purposes of brevity, surrounded by a metal wire coil 12. The coil 12 is of slightly less internal diameter than the outer diameter D (see FIGURE 1) of the plastic tube and hence deforms the tube to form a spiral indentation 14 in the outer surface thereof and a conforming spiral shaped radially inwardly extending projection 16 on the inner surface of the plastic tube. Since the loops of the metal coil are spaced from each other as shown, the loops in the spiral shaped projection on the interior surface of the tube are likewise spaced from each other and these spaced loops provide a bearing surface for the core element. Hence, instead of the core element being in frictional contact with the entire inner surface of the tube, it is in contact with only axially spaced projections i.e. the loops of the coil shaped deformation, thereby greatly reducing friction during movement of the core element. Where grease or oil is used as lubricant in the conduit, as will usually be the case, the projections on the inner wall of the tube additionally function to inhibit flow of the lubricant out of the conduit, the spaces between the projections serving as lubricant retaining recesses.

The plastic tube can be of any relatively soft organic polymer, preferably one of good inherent lubricity such as Teflon (polytetrafluoroethylene) nylon, or a polyalkylene such as polyethylene or polypropylene or copolymers thereof. The wall thickness of the tube should, of course, be such that the external deformation created by the constricting metal coil extends through the tube to provide the deformation on the interior surface thereof. The metal coil should preferably be of a relatively hard wire such as carbon steel.

To manufacture the conduit, the metal coil is first formed on a coil winding machine, the coil being made slightly less than the outer diameter D of the plastic tube. One end of the plastic tube is then forced into one end of the coil and the coil then threaded onto the tube by twisting the coil on its longitudinal axis with respect to the aligned plastic tube. As the coil threads onto the tube it deforms the tube to create the mating spiral thread therein both on the inner and outer tube surfaces. As an alternative method, the coil can be initially made with a larger I.D. and then swaged to the required smaller I.D. after the tube is inserted therein. If desired, a plastic outer casing can be coated or extruded over the outer surface of the plastic tube-metal coil assembly.

Because of the tight wrapping of the coil around the plastic tube, such that the coil is slightly embedded therein, the conduit has excellent strength against radial loads and ample tensile strength for most automotive and similar uses of such controls. Hence, there is provided a low cost durable conduit and control with excellent low friction operating characteristics.

For optimum strength and flexibility characteristics as well as optimum low friction characteristics, the pitch (i.e. the axial distance for one complete loop) of the metal coil should preferably be no greater than the outer diameter of the plastic tube. In the particular embodiment shown in FIGURE 1, for example, the plastic tube, made of polyethylene, had an internal diameter of about $\frac{1}{16}''$ and an external diameter of a little more than $\frac{1}{8}''$, and the metal coil had an internal diameter of a little less than $\frac{1}{8}''$ and a pitch also a little less than $\frac{1}{8}''$.

Figure 3:
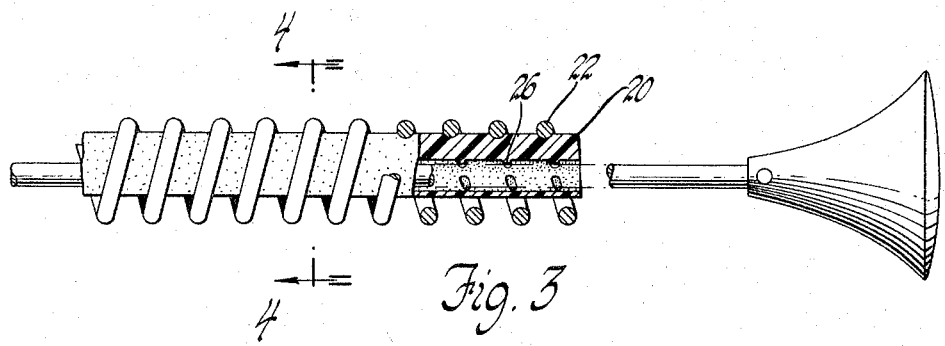
FIGURE 3 is a view similar to that of FIGURE 1 but of another embodiment of the invention.
Figure 4:
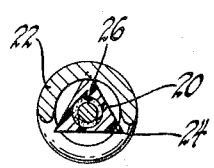
FIGURE 4 is a view taken on the line 4—4 of FIGURE 3.

In the FIGURE 1 embodiment the plastic tube is cylindrical, both interior and exterior. FIGURE 3 shows an embodiment wherein the bore of the plastic tube 20 is cylindrical; however, the exterior of the tube is of equilateral triangular cross section. The metal coil 22 is of a diameter such that it compresses and therefore deforms the corners 24 of the triangle, such deformation extending through the tube to cause commensurate radially inwardly extending projections 26 on the interior surface of the tube. Because the tube is not compressed and deformed on the side walls thereof, the internal axially spaced projections instead of being a part of a spiral as in FIGURE 1, are oriented in three axially extending rows, these rows being separated circumferentially from each other by 120°. Such construction still further reduces the amount of contact between the core and the tube.

It will be manifest that other configurations can also be used within the purview of the invention. For example, a tube with a round bore and a square exterior surface configuration can be used to provide four axially extending rows of internal projections separated from each other by 90°. The invention in its broadest scope also comprehends the use of a wrapping other than in the form of a coil though such will generally not serve to equal advantage either from the cost or performance standpoint. Further, as another method for manufacture of the preferred conduit as shown in the drawings, a relatively straight length of metal wire, as unreeled from a drum of wire, for example, can be tightly coiled around a plastic tube on a continuous basis as the tube is moved along a line through the wire coiling means to thereby manufacture the conduit in an indefinitely long length, such latter being cut to provide conduits of the precise length required.

One of the outstanding advantages of the conduit of this invention is that it can be routed around corners or through turns of very short radii without impairment to the efficiency of movement of the core element therewithin. For example, with conventional conduit efficiency of movement of the core element greatly diminishes where the conduit extends through a turn with a curvature having a diameter of less than about five inches. The conduit of the present invention can be extended through a curvature with a diameter as low as one inch without significant impairment to movement of the core element.

It will be understood that while the invention has been described in detail specifically with reference to certain preferred embodiments thereof, various changes and modifications may be made, all within the full and intended scope of the claims which follow.

I claim:

1. A flexible control comprising a conduit with a core element extending therethrough and movable therein, said conduit comprising a flexible tube having a cylindrical interior surface and an exterior surface of polygonal cross section surrounded by a wire wrapped sufficiently tightly on said tube to cause deformation of the exterior and interior surfaces thereof.

2. A conduit comprising a polygonal plastic tube surrounded by a wire wrapping extending generally axially of said tube, said wire wrapping deforming the exterior surface of said tube to create a mating depression therein and deforming the interior surface of said tube to create individual projections which are arranged in circumferentially spaced generally axially extending rows.

References Cited by the Examiner

UNITED STATES PATENTS

| 1,438,935 | 12/1922 | Denyes | 74—490 |
| 2,367,643 | 1/1945 | Hendrie | 138—129 |
| 3,149,480 | 9/1964 | Hunt | 74—501 X |
| 3,214,995 | 11/1965 | Gilmore | 74—501 |

FOREIGN PATENTS

| 510,016 | 4/1952 | Belgium. |
| 641,090 | 8/1950 | Great Britain. |

FRED C. MATTERN, Jr., *Primary Examiner.*

MILTON KAUFMAN, *Examiner.*

C. F. GREEN, *Assistant Examiner.*